Oct. 9, 1951  I. J. PEARSON  2,570,850
CONNECTOR FOR ATTACHING BACK-SPLASH
PANELS TO COUNTER TOPS
Filed Oct. 30, 1950
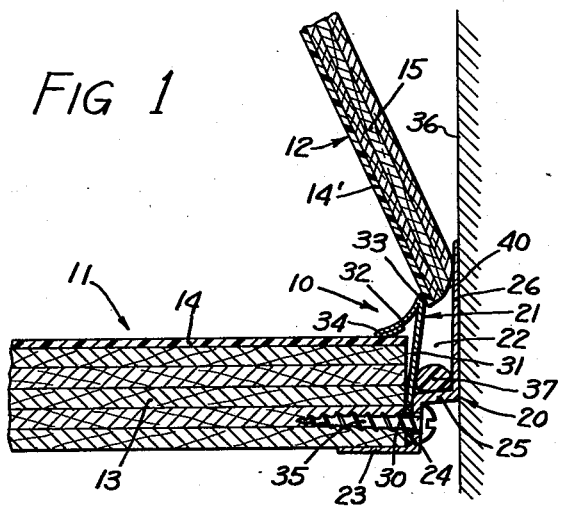
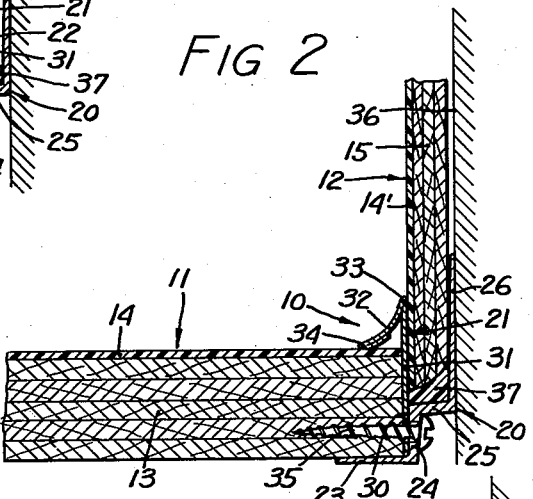
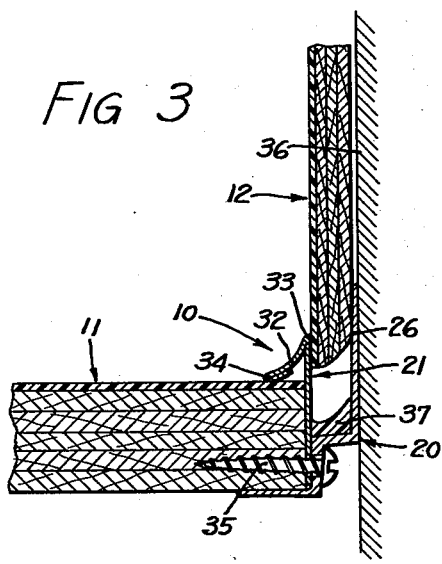
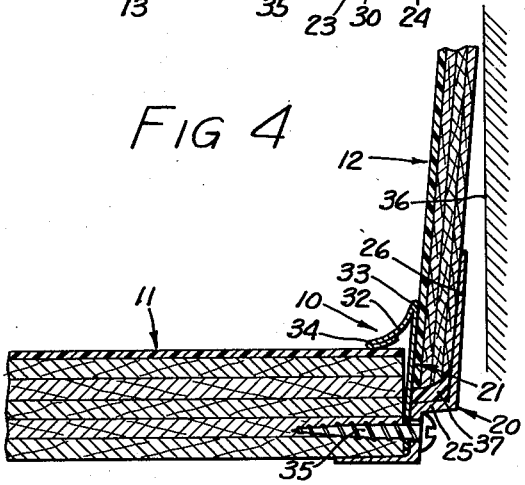
IRA J. PEARSON
INVENTOR
BY Herbert E. Kidder
AGENT Patented Oct. 9, 1951

2,570,850

UNITED STATES PATENT OFFICE 2,570,850

CONNECTOR FOR ATTACHING BACK-SPLASH PANELS TO COUNTER TOPS

Ira J. Pearson, Riverside, Calif.

Application October 30, 1950, Serial No. 192,946

8 Claims. (Cl. 311—104)

1

The present invention relates to a new and improved connector for attaching two panels together at right angles to one another, and more specifically to a connector for attaching back-splash panels to counter tops. Although not necessarily limited to such use, the invention finds particular utility in connection with the construction of built-in kitchen or bathroom counters and cabinets, where the counter top and back-splash panels are formed of sheet laminate bonded to plywood, of which Formica is one well-known example.

Where the counter top is exposed to water, as in a kitchen or bathroom, it is vitally important that the joint between the counter top and the back-splash panel be absolutely water-tight at all times, as penetration of water into the joint causes the plywood to swell and separate, and the supporting framework to warp and rot. If an excessive amount of water continues to seep through the joint over an extended period of time, the damage may spread to the wall plaster and flooring, with serious and costly effect.

The matter of producing and maintaining a water-tight joint is complicated by a number of factors. For one thing, it is necessary that the counter tops and back-splash panels be pressed and cut to shape in a shop equipped with specialized tooling and equipment to do the work, and the panels must then be installed on the counter or cabinet for which it is intended. The problem would be greatly simplified if the counter top and back-splash panels could be joined together at the shop, but this is frequently out of the question owing to considerations of size and awkwardness of the assembled structure, as well as interference with existing structure or equipment during installation, and the difficulty of coping with walls that are wavy and out of plumb, or not square at the corners, and floors that are not flat and level. Consequently, it is necessary that the final assembly be done at the time of installation on the counter.

If the back-splash panel is rigidly fixed to the counter top, or if the panel is solidly secured to the wall, trouble is almost inevitably experienced within a few years as the house settles. When this happens, the counter top and back-splash panel tend to pull apart, thereby opening up the joint and allowing water to seep through.

The present invention overcomes all of the above-mentioned difficulties by providing an absolutely water-tight joint that is quickly and easily installed, and that is constructed and arranged so as to remain absolutely water-tight for

2 the entire service life of the structure under normal conditions. This is accomplished by providing a connector that is attached to one of the panels and that is arranged to provide a deep pocket in which the edge of the other panel is inserted; the said other panel being gripped with a spring-pressure that permits a limited amount of relative shifting between the panels without opening up the joint to penetration by water. Thus, there is provided a full-floating joint that is capable of accommodating itself to any settling or shifting of the house, and that remains permanently water-tight and attractive in appearance.

The primary object of the invention, therefore, is to provide a connector for attaching two panels together at right angles to one another, while is simple and easy to install, permanently water-tight, attractive in appearance, and inexpensive.

Other objects and advantages of the invention will become apparent to those skilled in the art upon consideration of the following detailed description of the presently preferred embodiment thereof, reference being had to the appended drawings, wherein:

Figure 1 is a fragmentary cross sectional view through one form of my invention, showing a connector mounted on a counter top, and illustrating the manner in which the back-splash panel is inserted down into the pocket provided therefor;

Figure 2 is another view of the same after the back-splash panel has been fully seated in the pocket;

Figure 3 is a view showing the manner in which the connector permits relative vertical shifting movement between the counter top and back-splash panel as the house settles; and Figure 4 is another view showing the manner in which the connector permits the counter top to move out horizontally from the wall without separating from the back-splash panel or opening up the joint.

In the drawings, the connector is designated in its entirety by the reference numeral 10, while the counter top is indicated at 11, and the back-splash panel is shown at 12. In the illustrated form, the counter top is seen to comprise a ¾" plywood panel 13, to which a thin sheet of laminate 14, such as Formica, is bonded. The back-splash panel 12 is preferably made of ¼" thick plywood 15, to which the laminate 14' is bonded.

The connector 10 comprises two parts: a first member 20 which may be bent to the shape shown from a strip of heavy gage sheet steel or other metal, or may conveniently be produced as a non-ferrous extrusion; and a second member 21 of resilient material which cooperates with member 20 to form a pocket 22.

The first member 20 is preferably formed with a horizontal flange 23 that is adapted to fit against the underneath side of the plywood panel 13, and an upwardly bent portion 24 that fits against the back edge thereof. Projecting rearwardly from the top edge of the portion 24 is a horizontal shelf portion 25, and extending upwardly from the rear edge of the shelf is a vertical flange 26. The flange 26 is spaced rearwardly from the back edge of the counter top 11 a distance slightly greater than the thickness of the back-splash panel 12, and the flange projects for a substantial distance above the surface of the counter top; typically, about ¾ inch.

The second member 21 is preferably roll-formed from stainless steel strip or other strip material having considerable spring resiliency such as, for example, carbon steel, hard brass, and certain of the high-strength aluminum alloys. In addition to these spring metals, it is also contemplated that the second member 21 might be extruded or otherwise formed of one of the synthetic resin plastics, such as vinyl chloride or the like, having the necessary resiliency and elasticity.

Along the bottom edge of the member 21 is a relatively narrow, flat strip portion 30 which is clamped against the edge of the plywood panel 13 by the vertical portion 24 of the first member 20. The upper portion 31 of the member 21 is bent so that it is inclined toward the flange 26; the top edge of the portion 31 being spaced from the flange 26 a distance substantially less than the thickness of the back-splash panel 12, and terminating in a cove molding portion 32. The cove molding has an outer, or top lip 33 that bears rearwardly against the back-splash panel 12, and a bottom lip 34 that bears downwardly against the counter top 11.

The connector 10 is attached to the edge of the counter top 11 by means of screws 35 which are passed through holes in the vertical portion 24 of member 20 and strip portion 30 of member 21. The counter top is then mounted on the previously constructed frame of the counter (not shown), with the flange 26 abutting against the wall 36. Next, a quantity of non-drying mastic 37 is placed in the bottom of the pocket 22, and then the bottom edge of the back-splash panel 12 is inserted into the pocket, as shown in Figure 1, and pushed down into place, as in Figure 2. The bottom edge of the back-splash panel is preferably beveled or rounded off, as shown at 40, to facilitate insertion into the pocket 22, and as the back-splash panel is straightened up and pushed down into place, the member 21 is pried forwardly against its own spring tension. When the panel 12 is fully seated in the pocket 22, as in Figure 2, the bottom edge of the panel is pressed into and becomes embedded in the mastic 37. The top edge of the back-splash panel is then secured to the wall 36 by a molding strip or other suitable means.

As the member 21 is pried forwardly by the insertion of the back-splash panel in the pocket 22, the bottom lip 34 of the cove molding is pressed down more tightly against the counter top 11, while at the same time, the top lip 35 is pressed tightly against the back-splash panel. The back-splash panel is thus yieldingly gripped between the flange 26 and the lip 33 by the spring tension of the member 21, and is free to slide either lengthwise or outwardly of the pocket 22, or to take a limited amount of angular deflection with respect to the counter top, as in Figure 4, without opening the joint at the connector.

This ability of the connector 10 to permit relative displacement between the counter top and the back-splash panel without opening up at the joint is the secret of the success of my invention. As the house settles with age or otherwise shifts under changing conditions, there is almost inevitably a slight amount of deformation in the floors and walls, resulting in displacement of the counter-top with respect to the back-splash panel, or vice versa. Figure 3 shows the condition that is obtained when the counter top drops slightly with respect to the back-splash panel; the condition being somewhat exaggerated for the purpose of illustration. Note that even though the bottom edge of the panel 12 has pulled away from the mastic 37, the spring tension of the member 21 holds the lip 34 firmly against the surface of the counter top 11, and lip 33 firmly against the surface of the back-splash panel 12. No gaps have opened, and the joint is as tight as ever against penetration by water.

Figure 4 illustrates another condition, wherein the counter top has been pulled out from the wall 36. Since the top edge of the back-splash panel 12 is attached to the wall, while the bottom edge thereof is attached by the connector 10 to the counter top 11, the panel 12 is bent back at a slight angle from the perpendicular, bending the flange 26 with it. In this instance, the spring tension of the member 21 causes the upper portion 31 to follow the panel 12, so that even in the extreme condition shown, the top lip 33 is still in contact with the surface of the back-splash panel, while the bottom lip 34 is still in contact with the surface of the counter top. Here again, the joint is as tight as ever against penetration by water.

While I have shown and described in considerable detail what is now believed to be the preferred form of my invention, it will be understood that various changes may be made in the shape and arrangement of the various parts thereof, without departing from the broad scope of the invention, as defined in the appended claims.

I claim:

1. The combination with a counter top and a back-splash panel, of a connector comprising a member fixed to said counter top and having an upwardly projecting flange spaced rearwardly from the back edge thereof a distance substantially equal to the thickness of said back-splash panel, and a second member extending upwardly from the back edge of said counter top to a point above the top surface thereof, said second member being inclined rearwardly toward said flange so that its top edge is spaced therefrom a distance substantially less than the thickness of said back-splash panel, said second member being resiliently yieldable away from said flange to permit the bottom edge of said back-splash panel to be inserted therebetween, said bottom edge of said back-splash panel being yieldingly gripped between said flange and said second member by the spring pressure of the latter, whereby said back-splash panel is permitted a limited amount of shifting with respect to said counter top.

2. The combination with a counter top and a back-splash panel, of a connector comprising a member fixed to said counter top and having an upwardly projecting flange spaced rearwardly from the back edge thereof a distance substantially equal to the thickness of said back-splash panel, and a resilient second member extending upwardly from the back edge of said counter top to a point above the top surface thereof, said second member being inclined rearwardly toward said flange so that its top edge is spaced therefrom a distance substantially less than the thickness of said back-splash panel, the upper portion of said second member being provided with one lip bearing downwardly against the top surface of said counter top and another lip bearing against the face of said back-splash panel, said second member being yieldable away from said flange to permit the bottom edge of said back-splash panel to be inserted therebetween, said back-splash panel being yieldingly gripped between said flange and said other lip of said second member, and said one lip of said second member being spring-pressed downwardly against said counter top.

3. The combination with a counter top and a back-splash panel, of a connector comprising a member fixed to said counter top and having an upwardly projecting flange spaced rearwardly from the back edge thereof a distance substantially equal to the thickness of said back-splash panel, and a resilient second member extending upwardly from the back edge of said counter top and terminating in a cove molding portion, at least a portion of said second member being directed rearwardly toward said flange so that the top edge of said cove molding portion is spaced therefrom a distance substantially less than the thickness of said back-splash panel, said second member being yieldable away from said flange to permit the bottom edge of said back-splash panel to be inserted therebetween, and said bottom edge of said back-splash panel being yieldingly gripped between said flange and said top edge of said cove molding portion by the spring pressure of said second member, the bottom edge of said cove molding portion being spring-pressed downwardly against said counter top.

4. A connector for use in joining two panels together at substantially right angles to one another, said connector comprising a first member adapted to be fixed to the edge of one of said panels and having a flange perpendicular to the face thereof, and spaced from said edge a distance substantially equal to the thickness of the other panel, and a resilient second member cooperating with said first member to form a pocket to receive the adjoining edge of said other panel, said second member having a free outer lip that is normally spaced from said flange a distance less than the thickness of said other panel, said lip being yieldable away from said flange to permit the edge of said other panel to be inserted therebetween, said other panel being yieldingly gripped between said flange and said lip of said second member by the spring pressure of the latter, whereby a limited amount of relative shifting movement is permitted between said panels.

5. A connector for use in joining two panels together at substantially right angles to one another, said connector comprising a first member adapted to be fixed to the edge of one of said panels and having a flange perpendicular to the face thereof and spaced from said edge a distance substantially equal to the thickness of the other panel, and a second member of spring metal cooperating with said first member to form a pocket to receive the adjoining edge of said other panel, said second member projecting above the face of said one panel and terminating in a cove molding, at least a portion of said second member being directed toward said flange so that the outer lip of said cove molding is spaced therefrom a distance less than the thickness of said other panel, said second member being yieldable away from said flange to permit the edge of said other panel to be inserted therebetween, and said other panel being yieldingly gripped between said flange and said outer lip of said cove molding by the spring pressure of said second member, the other lip of said cove molding being spring-pressed tightly against said one panel.

6. A connector for use in joining two panels together at substantially right angles to one another, said connector comprising a first member adapted to be fixed to the edge of one of said panels, and having a flange perpendicular to the face thereof and spaced outwardly from said edge a distance substantially equal to the thickness of the other panel, and a second member of spring metal cooperating with said first member to form a pocket to receive the adjoining edge of said other panel, said second member projecting above the face of said one panel and being bent toward said flange so that its top edge is spaced therefrom a distance less than the thickness of said other panel, the outer portion of said second member being provided with one lip disposed to bear against the face of said one panel and another lip disposed to bear against the face of said other panel, said second member being yieldable away from said flange to permit the edge of said other panel to be inserted therebetween, said other panel being yieldingly gripped between said flange and said other lip of said second member, and said one lip of said second member being spring-pressed against the face of said one panel.

7. The combination with a counter top and a back-splash panel, of a connector comprising a member having one portion mounted against the back edge of said counter top, a horizontal shelf projecting rearwardly from said one portion, a flange extending upwardly from the back edge of said shelf and spaced from said back edge of said counter top a distance substantially equal to the thickness of said back-splash panel, a resilient second member extending upwardly from said shelf to a point above the top surface of said counter top, said second member being bent rearwardly toward said flange so that its top edge is spaced therefrom a distance less than the thickness of said back-splash panel, the upper portion of said second member being provided with one lip bearing downwardly against the top surface of said counter top and another lip bearing against the face of said back-splash panel, said second member being yieldable away from said flange to permit the bottom edge of said back-splash panel to be inserted therebetween, said back-splash panel being yieldingly gripped between said flange and said other lip of said second member, whereby said back-splash panel is permitted a limited amount of shifting with respect to said counter top, and said one lip of said second member being spring-pressed downwardly against said counter top.

8. The combination with a counter top and a back-splash panel, of a connector comprising a member having one portion mounted against the back edge of said counter top, a horizontal shelf projecting rearwardly from said one portion, a flange extending upwardly from the back edge of said shelf and spaced from said back edge of said counter top a distance substantially equal to the thickness of said back-splash panel, a second member of spring metal clamped between said one portion of said first-named member and said back edge of said counter top, said second member extending upwardly to a point above the top surface of said counter top and terminating in a cove molding, said second member being bent rearwardly toward said flange so that the outer lip of said cove molding is spaced therefrom a distance less than the thickness of said back-splash panel, said second member being yieldable away from said flange to permit the edge of said back-splash panel to be inserted therebetween, said back-splash panel being yieldingly gripped between said flange and said outer lip of said cove molding by the spring pressure of said second member, the other lip of said cove molding being spring-pressed tightly against the top face of said counter top, and fastening means passing through both said one portion of said first-named member and said second member for securing the same to said counter top.

IRA J. PEARSON.

REFERENCES CITED

The following references are of record in the file of this patent:

UNITED STATES PATENTS

| Number | Name | Date |
|---|---|---|
| 846,343 | Plym | Mar. 5, 1907 |
| 852,450 | Plym | May 7, 1907 |
| 946,734 | Rhoads | Jan. 18, 1910 |
| 1,352,531 | Rizzuto | Sept. 14, 1920 |
| 1,701,714 | Ballenger | Feb. 12, 1929 |
| 1,910,554 | Loehr et al. | Mar. 23, 1933 |
| 2,158,467 | Madsen | May 16, 1939 |
| 2,195,318 | Modray | Mar. 26, 1940 |
| 2,539,463 | Norquist | Jan. 30, 1951 |